United States Patent [19]

Goldberg et al.

[11] 4,100,126

[45] Jul. 11, 1978

[54] STABILIZATION OF NITRILE RESINS WITH HALF ACID SALTS OF MALEIC ACID

[75] Inventors: Gerald Goldberg; Paul Richard Kaufman, both of Parkersburg, W. Va.

[73] Assignee: Borg-Warner Corporation, Chicago, Ill.

[21] Appl. No.: 785,907

[22] Filed: Apr. 8, 1977

[51] Int. Cl.$^2$ .................. C08L 33/20; C08L 55/02
[52] U.S. Cl. .................. 260/29.6 AQ; 260/45.85 V; 260/29.6 AB; 260/876 R; 260/898
[58] Field of Search ............... 260/29.6 AB, 29.6 AQ, 260/45.85 V, 880

[56] References Cited

U.S. PATENT DOCUMENTS

| 2,617,784 | 11/1952 | Slocombe et al. | 260/45.85 V |
| 2,719,140 | 9/1955 | Slocombe et al. | 260/45.85 |
| 3,527,730 | 9/1970 | Coulson et al. | 260/45.7 |

Primary Examiner—V. P. Hoke
Attorney, Agent, or Firm—Richard J. Schlott

[57] ABSTRACT

Nitrile resins, when coagulated with a latex emulsion with inorganic salts of Group IIA metal ions and compounded with a half acid salt of maleic acid, exhibit marked improvement in stability toward thermal discoloration.

3 Claims, No Drawings

STABILIZATION OF NITRILE RESINS WITH HALF ACID SALTS OF MALEIC ACID

BACKGROUND OF THE INVENTION

The present invention relates to a method for stabilizing nitrile resins against discoloration resulting from thermal degradation during processing. More particularly this invention relates to the stabilization of polymers and graft polymers of acrylonitrile to prevent thermal discoloration by the inclusion of a minor amount of a half-acid salt of maleic acid.

Acrylonitrile polymer and copolymer resins are generally regarded as being materials of good thermal stability. They are, however, subject to thermal discoloration, and thermal processing of the unstabilized resins frequently results in development of yellow, amber and even reddish casts during the extrusion of films and fibers. Consequently a substantial effort has been made to develop methods for reducing or eliminating thermal discoloration to produce clear, color-stable films and molded articles. Prior art methods for stabilizing acrylonitrile resins against thermal discoloration include such processes as adding small amounts of alkali or alkaline earth metal salts of weak acids as stabilizers, such as is shown in U.S. Pat. No. 3,527,730. More recently, the addition of minor amounts of salts of half esters of maleic or fumeric acid to acrylonitrile resins has been shown to provide improved stability against thermal discoloration, such as is shown in U.S. Pat. No. 3,984,499.

SUMMARY OF THE INVENTION

It has now been found that certain half-acid salts of maleic acid are highly effective stabilizers for nitrile resins when employed with minor amounts of Group IIA metal salts. More particularly, the sodium and magnesium acid salts of maleic acid are very effective stabilizers for nitrile resins. The Group IIA metal salt is generally added by coagulation of the nitrile resin latex with an aqueous solution of the Group IIA metal salt. The half-acid salts of maleic acid are blended into the dry resin prior to thermal processing. The resulting compositions are markedly improved in stability toward yellowing during thermal processing.

DETAILED DESCRIPTION OF THE INVENTION

The resins which are useful for the purposes of this invention are polymers of an $\alpha,\beta$-unsaturated nitrile, one or more vinyl monomers copolymerizable with the unsaturated nitrile, and optionally a diene rubber, and include blends of two or more such resins.

The polymers are produced by polymerizing a mixture of an unsaturated nitrile such as acrylonitrile with one or more other vinyl monomers copolymerizable therewith in an aqueous medium, optionally in the presence of a performed diene rubber. The diene rubber may be a homopolymer of a conjugated diene monomer such as butadiene, 1,3-isoprene, and the like, or a rubbery copolymer thereof.

The unsaturated nitriles useful in the present invention are the alpha, beta unsaturated nitriles selected from the group consisting of acrylonitrile, alpha-chloroacrylonitrile, alpha-fluoroacrylonitrile, methacrylonitrile, ethacrylonitrile, and the like. The preferred unsaturated nitrile is acrylonitrile.

The vinyl monomers copolymerizable with the unsaturated nitriles which are useful in this invention include vinyl aromatic monomers, acrylate esters and the like. The vinyl aromatic monomers are selected from the group consisting of styrene, alpha-methylstyrene, the vinyl toluenes, the vinyl xylenes, and the like. The preferred vinyl aromatic monomer is styrene. The acrylate esters include those selected from the group consisting of methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates; methyl alpha-chloroacrylate, ethyl alpha-chloroacrylate, and the like. The preferred acrylate esters are methyl acrylate, ethy acrylate, methyl methacrylate, and ethyl methacrylate.

The polymers useful in this invention are prepared by the polymerization of 100 parts by weight of a mixture of from 10 to 90% by weight, preferably from 50 to 90% by weight, of at least one nitrile and from 90 to 10% by weight, preferably from 50 to 10% by weight, of at least one vinyl monomer selected from the group consisting of styrene, alpha-methylstyrene and acrylate esters, in the presence of from 0 to 40 parts by weight of a rubbery polymer of a conjugated diene selected from the group consisting of butadiene and isoprene optionally including up to 50% by weight of a comonomer selected from the group consisting of styrene, ethyl acrylate and acrylonitrile. The resin preparation may optionally include minor amounts of di or tri-functional monomer to accomplish additional cross-linking, as is well known in the art.

The nitrile resins are obtained by emulsion polymerization using any of a variety of widely-known processes and catalysts, including for example peroxide initiators, redox catalysts and the like. The polymerization processes which result in stable latex emulsions are well-described in the art and do not as such constitute a part of the invention described herein.

The resulting latices are coagulated and dried to provide the solid nitrile resin. Coagulation of resin latices is accomplished in the art by a variety of methods including addition of an alcohol or other water-miscible non-solvent, and salt-coagulation, which employs soluble electrolytes such as Group I, II or III inorganic salts. As will be further shown hereinbelow, the color stabilizers useful in this invention are effective only with nitrile resins that have been salt-coagulated with a Group IIA inorganic salt, and it is an essential part of the instant invention that the resins be coagulated with an inorganic salt of a Group IIA metal ion. The Group IIA metal salts useful for the purposes of this invention are the water soluble inorganic salts of magnesium, calcium, barium and strontium. Since the salts are employed to coagulate the nitrile resin latex, it is thus necessary that the salts be sufficiently water soluble to be useful in a salt-coagulation process step.

The sodium and magnesium half-acid salts of maleic acid are effective stabilizers even at very low levels, and thus may be employed in amounts as small as 0.01 part by weight per 100 parts by weight of nitrile resin. Although amounts as large as 10 parts by weight and greater may be employed, these large amounts will have a deleterious effect on resin properties, and therefore, as a practical matter the amounts employed will be less than 5 parts, preferably less than 1 part per hundred parts by weight of nitrile resins. The nitrile resins can be further compounded to the additives, pigments, colorants, stabilizers, etc., as is well known in the art, and may be blended with other resins.

The compositions of the present invention are thermoplastic materials which can be thermoformed into a wide variety of useful articles in any of the conventional ways employed with known thermoplastic polymeric materials, such as by extrusion, milling, molding, drawing, blowing, and the like. These polymers have excellent solvent resistance and their impact strength, good solvent resistance, and low permeability to gases and vapors make them very useful in the packaging industry, and they are particularly useful in the manufacture of bottles, film, and other types of containers for liquids and solids.

The following examples will further illustrate the present invention in greater detail, however, it is to be understood that the scope of this invention is not to be limited by these examples.

Example 1. Graft Polymer Latex Preparation.

A polymer reactor was charged with 1519.4g of a styrene-butadiene rubber (25% styrene) latex containing 600g of polymer solids, 896.2g of water, and 20g of sodium alkyl benzene sulfonate emulsifier. The reaction mixture was stirred and heated to 70° C and the following solutions were fed into the reactor over a 100 minute period.

1. 240g. of acrylonitrile, 160g of styrene, and 0.625g of cumene hydroperoxide.
2. 0.50g. of sodium formaldehyde sulfoxylate, 0.778g of trisodium hydroxyethyenediamine triacetic acid, and 0.024g ferrous sulfate in 100g of water.

The reaction was continued for two hours to give a graft polymer latex having 60% rubber component.

Example 2. Styrene-acrylonitrile copolymer latex preparation.

A polymer reactor was charged with 2003.8g of water, 0.75g of potassium persulfate, 37.5g of sodium alkyl benzene sulfonate emulsifier. The reaction mixture was stirred and heated to 70° C and the following solutions were fed continuously to the reactor over a 100 minute period.

1. 562.5g. of acrylonitrile, 187.5g. of styrene, and 1.125g of t-dodecyl mercaptan.
2. 3.75g of potassium persulfate in 246.2g of water.

The reaction was continued for 4 hours at 70° C to give an SAN copolymer latex.

Example 3. Copolymer Graft Polymer Blend Latex.

A latex blend was prepared by thoroughly mixing 300 parts of the graft polymer latex of Example 1. with 700 parts of the copolymer latex of Example 2. The resulting latex contains approximately 60 wt.% acrylonitrile.

Examples 4 – 15. Coagulation of Latices

Resin and resin blend latices prepared as in Examples 2 and 3 were coagulated by pouring into 1.5 volumes of water heated to 70° C and containing approximately 0.1 moles/liter of calcium chloride to provide compositions for testing. The coagulated latices were collected by filtration, washed with water and dried at 60° C in a circulating air oven.

The effectiveness of various stabilizers was determined by dry-mixing the stabilizer and dry resin, then adding the blend to the mixing head of a Brabender Plasticorder pre heated to 184° C. The material was allowed to flux, then sampled at the indicated times. The samples were compression molded into 33 mm. discs with Yellowness Index was measured on a General Electric Recording Spectrophotometer.

Table I

| Example No. | Additive[1] | Yellowness Index at 20 min. | Remarks |
|---|---|---|---|
| 4 | none | 40.0 | control |
| 5 | sodium acid maleate | 22.0 | |
| 6 | disodium maleate | 37.1 | prior art[2] |
| 7 | magnesium acid maleate | 26.0 | |
| 8 | magnesium maleate | 34.2 | prior art[2] |
| 9 | calcium acid maleate | 37.9 | |
| 10 | calcium maleate | 42.9 | prior art[2] |
| 11 | zinc acid maleate | 55.7 | |
| 12 | zinc maleate | 76.2 | |

Notes:
[1] Resin of Example 3, blended with ½ part of indicated additive and ¼ part calcium stearate lubricant.
[2] Prior art stabilizers shown for comparison; U.S. 3,527,730.

It will be seen by a comparison of Examples 5 and 7 with control Example 4 that the sodium and magnesium acid maleates are very effective color stabilizers for nitrile resins. The prior art salts shown in Examples 6, 8 and 10 are far less effective in preventing yellowing than the corresponding acid salts in this test procedure. That all acid maleates are not effective is demonstrated by the Yellowness Index data for Examples 9 and 11; surprisingly the calcium acid maleate provides very little color stabilization in this test, while the zinc acid maleate is deleterious and accelerates yellowing.

Example 13.

A portion of the latex of Example 3, coagulated with $CaCl_2$ and dried, was compounded with ½ part by weight sodium acid fumarate and ¼ part by weight calcium stearate per hundred parts by weight resin. The color stability test, run as before, gave the following Yellowness Index values:

28.7 at 5 min.; 55.5 at 10 min.; 68.8 at 15 min.

A control resin, tested without stabilizer, gave the following Yellowness Index values:

17.6 at 5 min.; 37.0 at 10 min.; 52.7 at 15 min.

Clearly sodium acid fumarate is not an effective color stabilizer for the resin compositions of this invention.

Example 14.

A portion of the latex of Example 3, coagulated with $CaCl_2$ and dried, was compounded with ¼ part by weight sodium acid maleate per hundred parts resin. The mixture was milled at 320° F, then compression molded into 60 mil films at 360° F and 20,000 psi, and held at 360° F for 20 min. The sample had a Yellowness Index value of 13.7.

A control blend without stabilizer had a Yellowness Index value of 24.1.

Example 15.

A portion of the latex of Example 3 was coagulated with alum and dried. The resin was compounded with ¼ by weight sodium acid maleate, milled and molded as in Example 14. The Yellowness Index value was 16.3.

A control blend without stabilizer had a Yellowness Index value of 19.4.

From a comparison of the data for Examples 14 and 15 it will be apparent that only marginal improvements are produced in resins conventionally coagulated with alum, while the improvement in color stability for resins coagulated with Group IIA metal salts is quite substantial.

The invention is thus a stabilized nitrile resin composition comprising a nitrile resin which is salt-coagulated with an inorganic salt of a Group IIA metal ion, and a half acid salt of maleic acid selected from the group consisting of sodium acid maleate and magnesium acid maleate.

We claim:

1. A nitrile resin composition stable toward thermal discoloration comprising:
    A. a polymer selected from the group consisting of polymers of an $\alpha,\beta$-unsaturated nitrile with at least one other vinyl monomer copolymerizable therewith; graft polymers of an $\alpha,\beta$-unsaturated nitrile, at least one additional vinyl monomer copolymerizable therewith and a diene rubber; and blends thereof, said polymer having been coagulated from a latex emulsion by use of an inorganic salt of a Group IIA metal ion, and
    B. as a stabilizer, an effective amount of a half-acid salt of maleic acid selected from the group consisting of sodium acid maleate and magnesium acid maleate.

2. A nitrile resin composition stable toward thermal discoloration comprising:
    A. 100 parts by weight of a polymer selected from the group consisting of polymers of an $\alpha,\beta$-unsaturated nitrile selected from the group consisting of acrylonitrile, alpha-chloroacrylonitrile, methacrylonitrile and mixtures thereof, and at least one other vinyl monomer copolymerizable therewith selected from the group consisting of styrene, alpha-methylstyrene, vinyl toluene, vinyl xylene, methyl acrylate, methyl methacrylate, ethyl acrylate, butyl acrylate;, graft polymers of an $\alpha,\beta$-unsaturated nitrile selected from the group consisting of acrylonitrile, alpha-chloroacrylonitrile, methacrylonitrile and mixtures thereof, at least one other vinyl monomer copolymerizable therewith, said vinyl monomer being selected from the group consisting of styrene, alpha-methylstyrene, vinyl toluene, vinyl xylene, methyl acrylate, methyl methacrylate, ethyl acrylate, and butyl acrylate, and a diene rubber, said diene rubber being selected from the group consisting of polybutadiene, polyisoprene, and rubbery copolymers thereof containing up to 50% by weight of a comonomer selected from the group consisting of styrene, acrylonitrile and ethyl acrylate; and blends thereof, said polymer having been coagulated from a latex emulsion by use of an inorganic salt of a Group IIA metal ion, and
    B. As a stabilizer, from 0.01 to 10 parts by weight of a half-acid salt of maleic acid from the group consisting of sodium acid maleate and magnesium acid maleate.

3. A method for stabilizing nitrile resins toward thermal discoloration comprising:
    A. Providing a latex emulsion of a polymer selected from the group consisting of polymers of an $\alpha,\beta$-unsaturated nitrile with at least one other vinyl monomer copolymerizable therewith; graft polymers of an $\alpha,\beta$-unsaturated nitrile, at least one other vinyl monomer copolymerizable therewith and a diene rubber; and blends thereof,
    B. Coagulating the nitrile resin from the latex emulsion by use of an inorganic salt of a Group IIA metal ion, and
    C. Adding to the nitrile resin an effective amount of a half-acid salt of maleic acid selected from the group consisting of sodium acid maleate and magnesium acid maleate.

* * * * *